(12) United States Patent
Chowdhary et al.

(10) Patent No.: US 9,277,428 B2
(45) Date of Patent: Mar. 1, 2016

(54) METHOD AND APPARATUS FOR RESPONDING TO A POTENTIAL MASS RANDOM ACCESS EVENT

(71) Applicant: MOTOROLA SOLUTIONS, INC, Schaumburg, IL (US)

(72) Inventors: Dipendra M Chowdhary, Hoffman Estates, IL (US); John P Belmonte, Schaumburg, IL (US); Thomas B Bohn, Mc Henry, IL (US); Satyanarayan R Panpaliya, Palatine, IL (US); Badarinath Patibandla, Schaumburg, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 105 days.

(21) Appl. No.: 14/264,821

(22) Filed: Apr. 29, 2014

(65) Prior Publication Data
US 2015/0312781 A1  Oct. 29, 2015

(51) Int. Cl.
*H04W 28/02* (2009.01)
*H04W 24/04* (2009.01)
*H04W 74/08* (2009.01)

(52) U.S. Cl.
CPC .......... *H04W 24/04* (2013.01); *H04W 28/0236* (2013.01); *H04W 74/0833* (2013.01); *H04W 28/0242* (2013.01)

(58) Field of Classification Search
CPC .................... H04W 74/0825; H04W 74/0833; H04W 28/08; H04W 4/06; H04W 4/12; H04W 72/044; H04W 72/082; H04W 72/12; H04W 74/002; H04W 74/04; H04W 74/0866; H04B 17/345; H04L 12/1881; H04L 12/413; H04L 1/1854; H04L 2001/125; H04L 5/006; H04L 67/32
See application file for complete search history.

(56) References Cited

U.S. PATENT DOCUMENTS

| | | | | |
|---|---|---|---|---|
| 5,923,742 A * | 7/1999 | Kodialam | ............... | H04M 3/36 379/111 |
| 6,075,795 A * | 6/2000 | Barsoum | ........... | H04W 74/0825 370/445 |
| 6,690,661 B1 * | 2/2004 | Agarwal | ................... | H04L 1/16 370/337 |
| 6,873,607 B1 * | 3/2005 | Hamada | ............... | H04B 7/0491 370/321 |
| 7,130,397 B2 * | 10/2006 | Ferguson | .............. | H04M 3/365 379/112.04 |
| 7,379,705 B1 * | 5/2008 | Rados | ............... | H04M 1/72547 455/2.01 |
| 7,817,789 B2 * | 10/2010 | Ferguson | .............. | H04M 3/367 379/112.04 |

(Continued)

FOREIGN PATENT DOCUMENTS

| | | |
|---|---|---|
| WO | 2006107909 A2 | 10/2006 |
| WO | 2007065291 A1 | 6/2007 |
| WO | 2013087835 A1 | 6/2013 |

*Primary Examiner* — Matthew Sams
(74) *Attorney, Agent, or Firm* — Daniel R. Bestor (57) ABSTRACT

A radio controller monitors a radio channel for a first period of time and determines a first indication of signals received without detecting synchronization or with detecting synchronization but failing error correction during that time. Responsive to determining that the first indication is above a predetermined threshold indicative of an interference condition, causing an instruction to be broadcast identifying a subset of subscriber devices allowed transmitting random access requests on the radio channel. The radio controller monitors the radio channel for a second period of time and determines a second indication during that time. If the second indication is an improvement over the first indication, the radio controller determines that the interference condition is caused by the mass random access event.

20 Claims, 6 Drawing Sheets

(56) References Cited

U.S. PATENT DOCUMENTS

| | | | | |
|---|---|---|---|---|
| 7,899,023 B2* | 3/2011 | Tzidon | ............... | H04L 29/12254 370/342 |
| 8,085,806 B2* | 12/2011 | Boer | ................... | H04L 27/0012 370/445 |
| 8,259,690 B2* | 9/2012 | Wiatrowski | ......... | H04W 76/066 370/329 |
| 8,902,742 B2* | 12/2014 | Viorel | ............... | H04W 28/0205 370/229 |
| 2004/0022366 A1* | 2/2004 | Ferguson | ............ | H04M 3/365 379/1.01 |
| 2004/0146019 A1* | 7/2004 | Kim | ................... | H04W 74/002 370/329 |
| 2006/0245550 A1* | 11/2006 | Ferguson | ............... | H04M 3/367 379/32.01 |
| 2008/0291853 A1* | 11/2008 | Wiatrowski | ......... | H04W 76/066 370/310 |
| 2009/0116414 A1* | 5/2009 | Or | ........................ | H04M 3/493 370/276 |
| 2010/0306322 A1* | 12/2010 | Conahan | ............... | G06Q 10/107 709/206 |
| 2014/0098660 A1* | 4/2014 | Viorel | ............... | H04W 28/0205 370/229 |
| 2015/0009813 A1* | 1/2015 | Nguyen | ................ | H04W 4/005 370/230 |

* cited by examiner

METHOD AND APPARATUS FOR RESPONDING TO A POTENTIAL MASS RANDOM ACCESS EVENT

BACKGROUND OF THE INVENTION

Radio access networks (RANs) provide for radio communication links to be arranged within the network between a plurality of user terminals. Such user terminals may be mobile and may be known as 'mobile stations' or 'subscriber devices.' At least one other terminal, e.g. used in conjunction with subscriber devices, may be a fixed terminal, e.g. a base station, eNodeB, repeater, and/or access point. Such a RAN typically includes a system infrastructure that generally includes a network of various fixed terminals, which are in direct radio communication with the subscriber devices. Each of the fixed terminals operating in the RAN may have one or more transceivers which may, for example, serve subscriber devices in a given region or area, known as a 'cell' or 'site', by radio frequency (RF) communication. The subscriber devices that are in direct communication with a particular fixed terminal are said to be served by the fixed terminal In one example, all radio communications to and from each subscriber device within the RAN are made via respective serving fixed terminals. Sites of neighboring fixed terminals may be offset from one another and may be non-overlapping or partially or fully overlapping with one another.

RANs may operate according to an industry standard protocol such as, for example, an open media alliance (OMA) push to talk (PTT) over cellular (OMA-PoC) standard, a voice over IP (VoIP) standard, or a PTT over IP (PoIP) standard. Typically, protocols such as PoC, VoIP, and PoIP are implemented over broadband RANs including third generation and fourth generation networks such as third generation partnership project (3GPP) Long Term Evolution (LTE) networks.

RANs may additionally or alternatively operate according to an industry standard land mobile radio (LMR) protocol such as, for example, the Project 25 (P25) standard defined by the Association of Public Safety Communications Officials International (APCO), or other radio protocols, the TETRA standard defined by the European Telecommunication Standards Institute (ETSI), the Digital Private Mobile Radio (dPMR) standard also defined by the ETSI, or the Digital Mobile Radio (DMR) standard also defined by the ETSI. Because these generally systems provide lower throughput than the 3GPP and LTE systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) protocols. Subscriber devices in RANs such as those set forth above send and receive auditory data (encoded voice, audio, or audio portions of an audio/video stream) and other types of data in accordance with the designated protocol.

OMA-PoC, in particular, enables familiar PTT and "instant on" features of traditional half duplex subscriber devices, but uses mobile subscriber devices operating over modern cellular telecommunications networks. Using PoC, wireless subscriber devices such as mobile telephones and notebook computers can function as PTT half-duplex subscriber devices for transmitting and receiving auditory data. Other types of PTT models and multimedia call models (MMCMs) are also available.

Floor control in an OMA-PoC session is generally maintained by a PTT server that controls communications between two or more wireless subscriber devices. When a user of one of the subscriber devices keys a PTT button, a request for permission to speak in the OMA-PoC session is transmitted from the user's subscriber device to the PTT server using, for example, a real-time transport protocol (RTP) message. If no other users are currently speaking in the PoC session, an acceptance message is transmitted back to the user's subscriber device and the user can then speak into a microphone of the device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other subscriber devices in the group of subscriber devices or talkgroup to which the user is subscribed), using for example a unicast, point to multipoint, or broadcast communication technique.

Narrowband LMR systems, on the other hand, operate in either a conventional or trunked configuration. In either configuration, a plurality of subscriber devices are partitioned into separate groups of subscriber devices. In a conventional system, each subscriber device in a group is selected to a particular frequency for communications associated with that subscriber device's group. Thus, each group is served by one channel, and multiple groups may share the same single frequency (in which case, in some embodiments, group IDs may be present in the group data to distinguish between groups using the same shared frequency).

In contrast, a trunked radio system and its subscriber devices use a pool of traffic channels for virtually an unlimited number of groups of subscriber devices (e.g., talkgroups). Thus, all groups are served by all channels. The trunked radio system works to take advantage of the probability that not all groups need a traffic channel for communication at the same time. When a member of a group requests a call on a control or rest channel on which all of the subscriber devices in the system idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the subscriber devices were idling to a traffic channel for the call, and instruct all subscriber devices that are not participating in the new call to move to a newly assigned control or rest channel selected from the pool of available channels. With a given number of channels, a much greater number of groups can be accommodated in a trunked system as compared with conventional radio systems.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., subscriber devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, subscriber devices may dynamically affiliate with a group (and also disassociate with the group) perhaps based on user input, and the switching and/or radio network may track group membership and route new group calls according to the current group membership.

One problem that has arisen with the increasing proliferation of wireless subscriber devices is that in the event of a large number of such subscriber devices attempting to register on a same random access radio channel such as the trunked control channel or conventional channel noted above, the large number of registration requests (or other random access requests) are likely to collide with each other over a period of time and may generate what looks like mere interference to the fixed terminal or terminals tasked with registering and/or serving the large number of such subscriber devices. For example, large numbers of subscriber devices may attempt to register (or otherwise transmit a random access request) on a random access radio channel (e.g., what is called a "mass random access event") as a result of: a site failure at a nearby radio site or fixed terminal, an initial powering on of a radio site or fixed terminal in a vicinity of the plurality of subscriber devices, an initial powering on of a large number of subscriber devices near a radio site or fixed terminal within a short period of time, an occurrence of an event requiring an emergency response within a particular area associated with a radio site or fixed terminal, and/or a change in affiliation of a large number of subscriber devices within a short period of time, among other possibilities. Such events could delay or prevent group-call services from being provided to some or all of the subscriber devices in the vicinity of the affected fixed terminal or radio site.

Accordingly, what is needed is an improved method and apparatus for handling mass registration events, and in particular, for distinguishing between mere interference and mass random access events and taking corresponding action in the infrastructure as a result of the determination.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method and apparatus for handling mass registration events, and in particular, for distinguishing between mere interference and mass random access events and taking corresponding action in the infrastructure as a result of the determination.

In one embodiment, a method for responding to a mass random access event starts with monitoring, at a radio controller, a radio channel for a first period of time and determining a first indication of signals received without detecting synchronization or with detecting synchronization but failing error correction during the first period of time. Responsive to determining, by the radio controller, that the first indication of signals received without detecting synchronization or with detecting synchronization but failing error correction during the first period of time is above a predetermined threshold indicative of an interference condition comprising one of an interferer and mass random access event, causing an instruction to be broadcast identifying a subset of subscriber devices, less than all subscriber devices, allowed to transmit random access requests on the radio channel. After transmitting the instruction, monitoring, at the radio controller, the radio channel for a second period of time and determining a second indication of signals received without detecting synchronization or with detecting synchronization but failing error correction during the second period of time. If the second indication is an improvement over the first indication, determining, by the radio controller, that the interference condition is caused by the mass random access event. If the second indication is not an improvement over the first indication, determining, by the radio controller, that the interference condition is caused by the interferer.

In another embodiment, a radio controller in a radio system comprises a transceiver, a data store, and one or more processors. The one or more processors are configured to: monitor, via the transceiver, a radio channel for a first period of time and determine a first indication of signals received without detecting synchronization or with detecting synchronization but failing error correction during the first period of time; responsive to determining that the first indication of signals received without detecting synchronization or with detecting synchronization but failing error correction during the first period of time is above a predetermined threshold indicative of an interference condition comprising one of an interferer and mass random access event, cause an instruction to be broadcast, via the transceiver, identifying a subset of subscriber devices, less than all subscriber devices, allowed to transmit random access requests on the radio channel; monitor, via the transceiver, the radio channel for a second period of time and determining a second indication of signals received without detecting synchronization or with detecting synchronization but failing error correction during the second period of time; and if the second indication is an improvement over the first indication, determining that the interference condition is caused by the mass random access event. The one or more processors may be further configured to, if the second indication is not an improvement over the first indication, determine that the interference condition is caused by the interferer.

Each of the above-mentioned embodiments will be discussed in more detail below, starting with example network and device architectures of the system in which the embodiments may be practiced, followed by an illustration of processing steps and message transmissions for distinguishing between mere interference and mass random access events and taking corresponding action in the infrastructure as a result. Further advantages and features consistent with this disclosure will be set forth in the following detailed description, with reference to the figures.

1. Network Architecture and Device Structure

Figure 1:
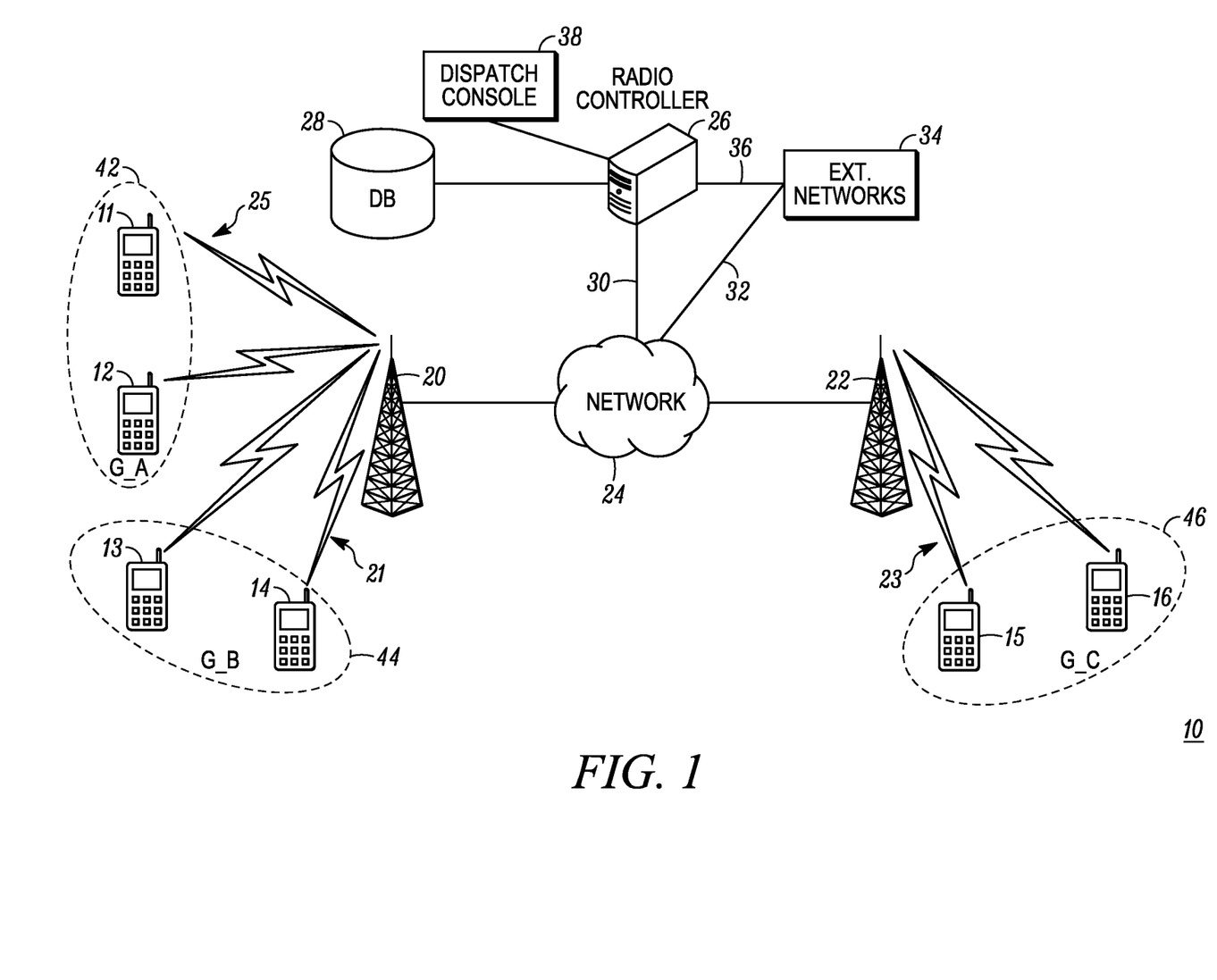
FIG. 1 is a block diagram of a communications network in accordance with some embodiments.

FIG. 1 illustrates a communications network 10 including client subscriber devices (e.g., SDs) 11-16, fixed terminals 20, 22 (e.g. base stations (BSs)), wireless links 21, 23, 25, backhaul network 24, radio controller 26, database 28, communications connections 30, 32, 36, dispatch console 38, and external networks 34. Each BS 20, 22 has at least one radio transmitter covering a radio coverage cell (not shown). One or several SDs 11-16 within radio coverage of the BSs may connect to the BSs using a wireless communication protocol via wireless links 21, 23, 25. The SDs 11-16 may communicate with each other, and perhaps other devices accessible via other network links, using a group communications protocol over wireless links 20, 22. Wireless links 21, 23 may be, for example, a wireless link supporting a standard or protocol such as GPRS or UMTS, 2G (e.g. GSM), 3G (e.g. WCDMA or LTE), 4G (WiMAX or LTE), iDEN, wireless LAN (WLAN), ETSI Digital Mobile Radio (ETSI-DMR), Project 25 (P25) standard defined by the Association of Public Safety Communications Officials International (APCO), or other radio protocols or standards. The SDs 11-16 may be configured with an identification reference (such as an International Mobile Subscriber Identity (IMSI)) which may be connected to a physical media (such as a Subscriber Identity Module (SIM) card).

Each SD 11-16 may be a group communications device, such as a push-to-talk (PTT) device, that is normally maintained in a monitor only mode, and which switches to a transmit-only mode (for half-duplex devices) or transmit and receive mode (for full-duplex devices) upon depression or activation of a PTT input switch. The group communications architecture in communications network 10 allows a single SD, such as SD 11, to communicate with one or more members (such as SD 12) associated with a particular group of SDs at the same time. In the example set forth in FIG. 1, SDs 11 and 12 are members of a first group G_A 42, SDs 13 and 14 are members of a second group G_B 44, and SDs 15 and 16 are members of a third group G_C 46.

Although only six SDs, three groups, and two BSs are illustrated in FIG. 1, the present disclosure is not limited as such, and more or fewer SDs, more or fewer groups, and more or fewer BSs could be used in any particular implementation. Furthermore, while a single radio controller 26 is illustrated in FIG. 1, more than one radio controller 26 may be used and/or a distributed radio controller 26 may be used that divides functions across multiple devices, perhaps for load balancing reasons. Finally, while database 28 is illustrated as directly coupled to radio controller 26, database 28 may also be remote from radio controller 26 and accessible to radio controller 26 via one or more of network 24 and/or external networks 34.

The BSs 20, 22 may be linked to the radio controller 26 via network 24 and communications connection 30. Network 24 may comprise one or more BSs, routers, switches, LANs, WLANs, WANs, access points, or other network infrastructure. For example, radio controller 26 may be accessible to BSs 20, 22 via a dedicated wireline or via the Internet. In one example, BSs 20, 22 may be directly coupled to radio controller 26, or to other radio controllers, via one or more internal links. Network 24 may further include a call controller, PTT server, zone controller, mobile management entity (MME), base station controller (BSC), mobile switching center (MSC), site controller, Push-to-Talk controller, or other network device for controlling and distributing group auditory data amongst SDs via respective BSs.

Radio controller 26 may be a device configured to monitor conditions of one or more radio channels provided at BSs 20, 22 under its control. Radio controller 26 may or may not also provide additional functions such as registration, authentication, and/or authorization of SDs for operation within the communications network 10, assignment of channels, assignments of talkgroups, or other functions. In other embodiments, radio controller 26 may be embodied within or coupled to another network device, such as a call controller, zone controller, repeater, PTT server, MME, BSC, MSC, site controller, Push-to-Talk controller, or other network device, existing in network 24, at BSs 20, 22, or elsewhere.

Database 28 may function to store various information, such as subscriber device profiles that may indicate, perhaps based on SD IMSI information, radio ID, IP address, and/or other information, what SDs are authorized for service in communications network 10, what services such SDs are authorized to access, and authentication information for use in authenticating an identity of a particular SD or SD user. For example, database 28 may function as a home and/or visitor location register (e.g., HLR/VLR). Database 28 may also store mappings identifying which subscriber devices belong to which groups for use in routing group auditory and/or other group data transmissions.

The one-to-many group communication structure may be implemented in communications network 10 in a number of ways and using any one or more messaging protocols, including multiple unicast transmissions (each addressed to a single group member SD), single multicast transmissions (addressed to a single group or multiple groups), single broadcast transmissions (the broadcast transmission perhaps including one or more group identifiers that can be decoded and matched by the receiving SDs), or any combination thereof.

External networks 34 may also be accessible to BSs 20, 22 (and thus SDs 11-16) via network 24 and communications connection 32 and/or radio controller 26 and communications connections 30, 36. External networks 34 may include, for example, a public switched telephone network (PSTN), the Internet, or another wireless service provider's network, among other possibilities.

Communications system 10 may implement, in one embodiment, a narrow-band trunked radio communication system in which SDs 11-16 transmit control and data messages in accordance with an air interface protocol such as that defined by the ETSI-DMR or APCO P25 standards. In this embodiment, wireless links 21, 23, 25 may be shared channels based on group membership. For example, group G_A 42 SDs 11 and 12 may share a same conventional (statically assigned frequency) or trunked (dynamically assigned frequency and/or timeslot) channel over narrowband wireless link 25, group G_B 44 SDs 13 and 14 may share a same conventional or trunked channel over narrowband wireless link 21, and group G_C SDs 15 and 16 may share a same conventional or trunked channel over narrowband wireless link 23. Other types of narrowband conventional or trunked protocols could be implemented as well.

In another embodiment, communications system 10 may implement an OMA-PoC or PoIP broadband architecture in which SDs 11-16 transmit control and data messages in accordance with a protocol such as RTP and/or SIP. In this embodiment, wireless links 21, 23, 25 may carry individual broadband IP links over which group traffic is unicast, multicast, or broadcast. For example, group G_A 42 SDs 11 and 12 may establish unicast, multicast, and/or broadcast IP links over broadband wireless link 25, group G_B 44 SDs 13 and 14 may establish unicast, multicast, and/or broadcast IP links over broadband wireless link 21, and group G_C SDs 15 and 16 may establish unicast, multicast, and/or broadcast IP links over broadband wireless link 23. Other types of broadband protocols could be implemented as well.

Dispatch console 38 may be directly coupled to radio controller 26 as shown, or may be indirectly coupled to radio controller 26 via one or more of network 24 and external networks 34, or some other network device such as a radio controller in network 24. The dispatch console 38 may provide an administrative or dispatch access to SDs 11-16 and radio controller 26, and allow an administrator or dispatcher to initiate infrastructure-sourced group communications to groups of SDs 11-16, among other features and functions.

Figure 2:
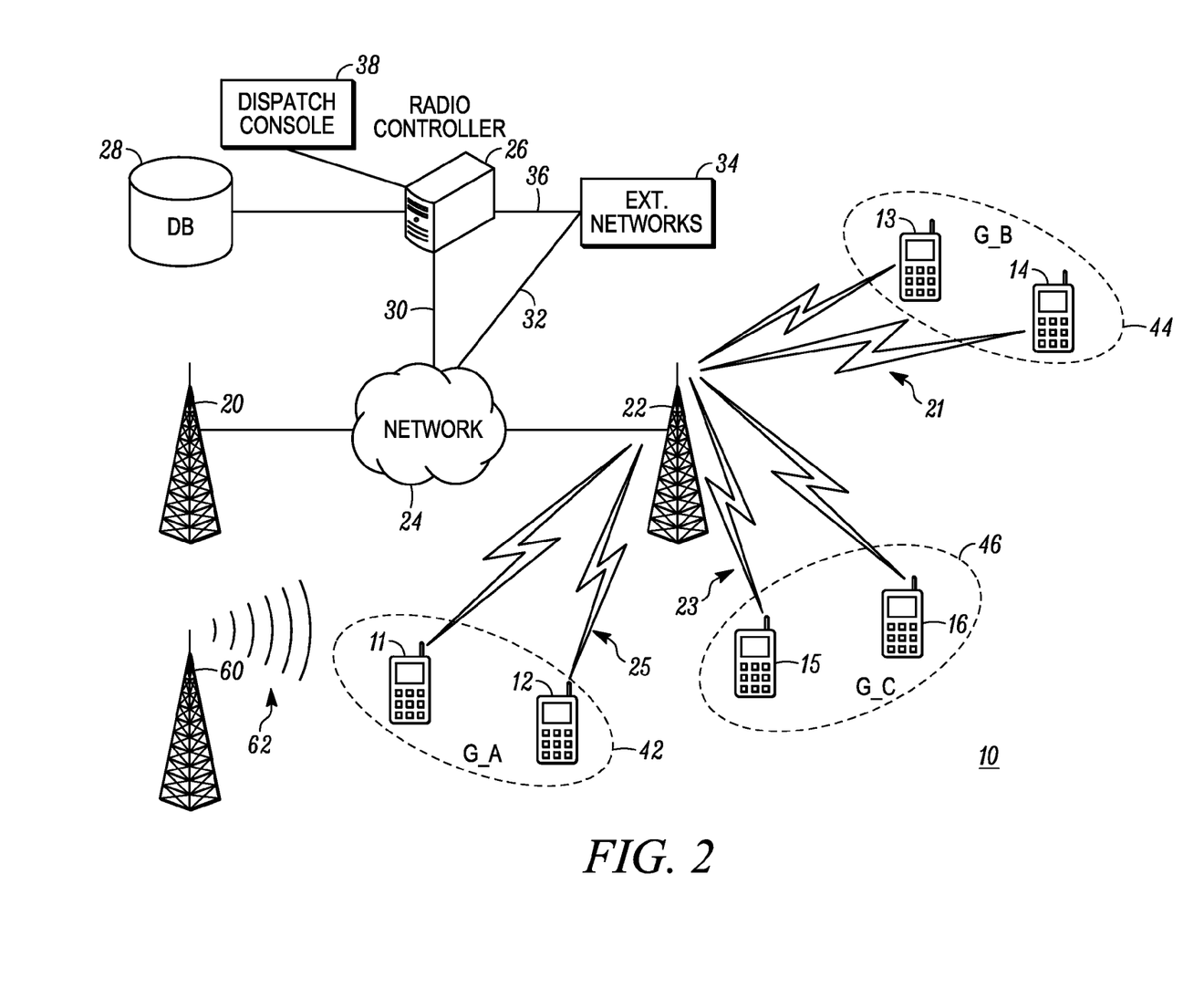
FIG. 2 is a block diagram of the communications network of FIG. 1 illustrating a failure of an infrastructure device and a resultant subscriber device mass registration event at a neighboring fixed terminal or radio site, in accordance with some embodiments.

Referring to FIG. 2, an example interference condition (e.g., due to an interferer or mass registration event) is illustrated in which. For example, and for any number of the reasons already set forth above, fixed terminal 20 may become inoperative and SDs 11-14 of groups G_A 42 and G_B 44 may move in-mass to attempt to obtain service from nearby fixed terminal 22 and begin sending random access registration requests substantially simultaneously over a same conventional channel, trunked channel, rest channel, control channel, and/or other random access radio channel associated with fixed terminal 22. The mass registration at fixed terminal 22 may cause fixed terminal 22 and radio controller 26 to detect an interference condition on a monitored channel associated with fixed terminal 22. In another example, a third party interferer device 60 that is not under control of the operator of the communications network embodied by the radio controller 26 and fixed terminal 22 may emit signals 62 on or close enough to the monitored channel associated with fixed terminal 22 to cause the cause fixed terminal 22 and radio controller 26 to detect an interference condition on the monitored channel associated with fixed terminal 22. The example set forth in FIGS. 1 and 2 is exemplary in nature only, and in other embodiments, the mass registration event may be associated with 10-100 SDs or more, all attempting to access a same random access radio channel, for registration or other purposes, and the number of third party interferers may be greater than one.

Figure 3:
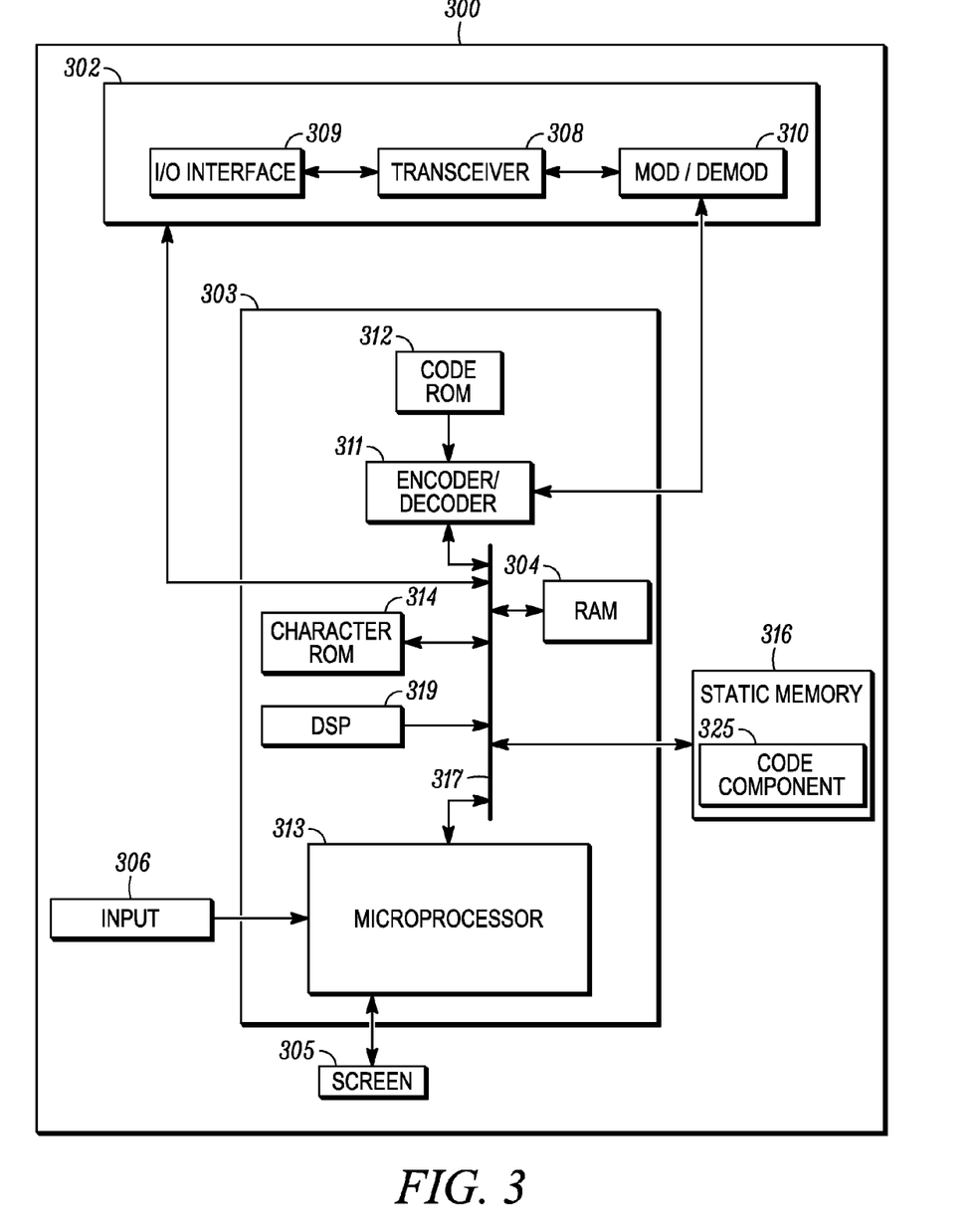
FIG. 3 is a block diagram of a radio controller in accordance with some embodiments.

Referring to FIG. 3, a block diagram illustrates a radio controller 300 used in accordance with some embodiments. The radio controller 300 may be the same or similar to the radio controller 26 of FIGS. 1 and 2. The radio controller 300 includes a communications unit 302 coupled to a common data and address bus 317 of a processing unit 303. The radio controller 300 may also include an input unit (e.g., keypad, pointing device, etc.) 306 and a display screen 305, each coupled to be in communication with the processing unit 303.

The processing unit 303 may include an encoder/decoder 311 with an associated code ROM 312 for storing data for encoding and decoding voice, data, control, or other signals that may be transmitted or received by the radio controller 300. The processing unit 303 may further include a microprocessor 313 coupled, by the common data and address bus 317, to the encoder/decoder 311, a character ROM 314, a RAM 304, and a static memory 316.

The communications unit 302 may include an I/O interface 309 configurable to communicate with network components (for example, a zone controller, database, or dispatch console), and other user equipment (for example, SDs) communicatively coupled to the radio controller 300. The communications unit 302 may include one or more broadband and/or narrowband transceivers 308, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Additionally or alternatively, the communications unit 302 may include one or more local area network or personal area network transceivers such as a Wi-Fi transceiver perhaps operating in accordance with an IEEE 802.11 standard (e.g., 802.11a, 802.11b, 802.11g). Additionally or alternatively, the communications unit 302 may include one or more wire-line transceivers 308, such as an Ethernet transceiver, a Universal Serial Bus (USB) transceiver, or similar transceiver configurable to communicate via a twisted pair wire, a coaxial cable, a fiber-optic link or a similar physical connection to a wire-lined network.

The transceivers may be coupled to a combined modulator/demodulator 310 that is coupled to the encoder/decoder 311. The character ROM 314 stores code for decoding or encoding data such as control, request, or instruction messages, and/or auditory data. Static memory 316 may store operating code associated with distinguishing between mere interference and mass random access events and for taking corresponding action in the infrastructure as a result of the determination, including one or more of the processing steps and message transmissions and/or receptions set forth in FIGS. 4-6.

2. Processes for Distinguishing Interference and Mass Random Access Events and Taking Corresponding Action FIGS. 4-6 set forth flow diagrams 400, 600 and a message diagram 500 illustrating process steps and messages for distinguishing between mere interference and mass random access events, and for taking corresponding action in the infrastructure as a result. Of course, additional steps, receptions, and/or transmissions and various types and structures of messages not disclosed herein could be additionally added before, after, in-between or in place of steps, messages, receptions, and/or transmissions disclosed in FIGS. 4-6, and the presence of such additional or replacement steps, messages, receptions, and/or transmissions would not negate the purpose and advantages of the examples set forth in detail throughout the remainder of this disclosure.

Figure 4:
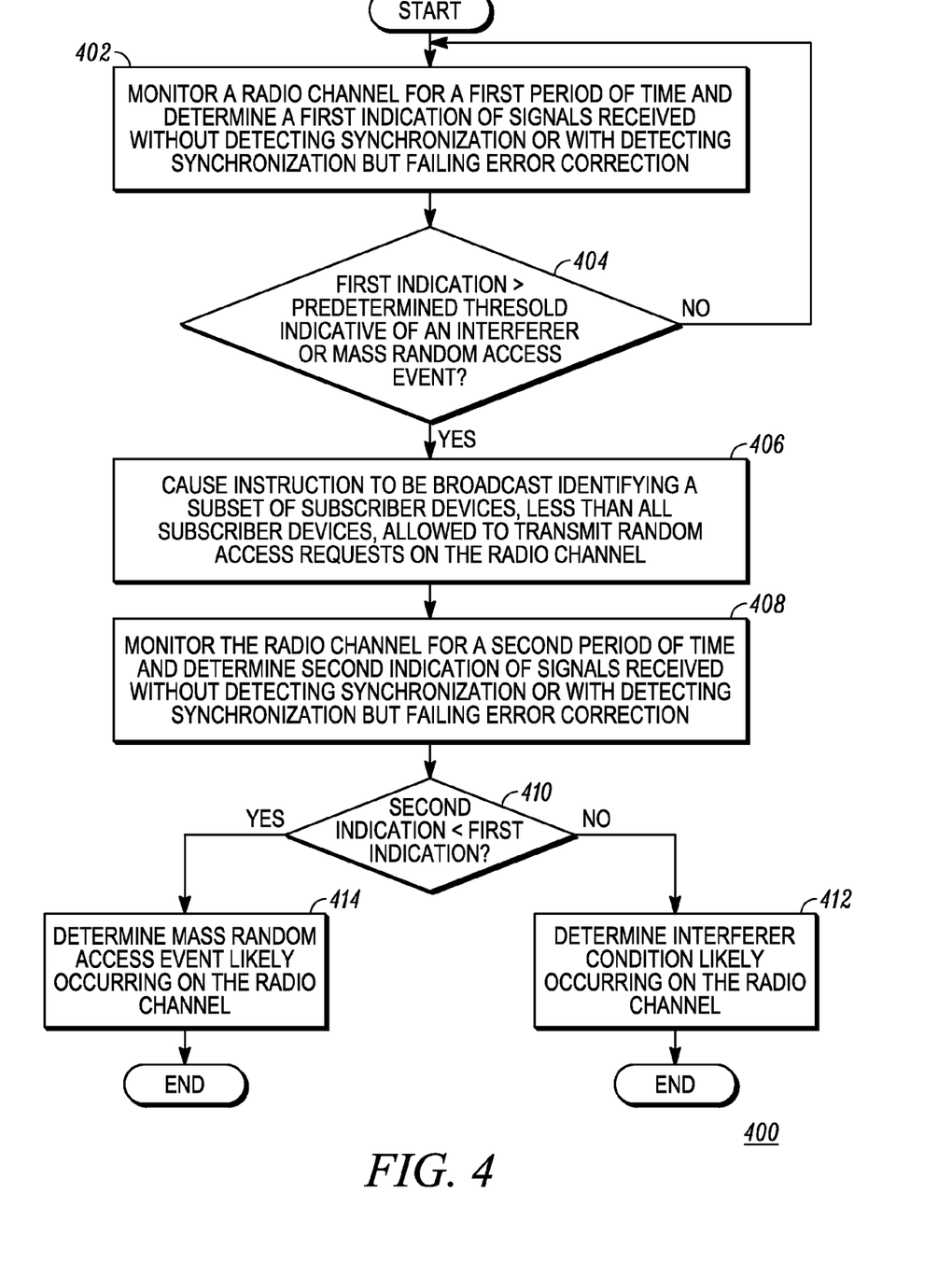
FIG. 4 is a flow diagram illustrating processing steps at the radio controller server of FIG. 3 for distinguishing between interference and a mass random access event in accordance with an embodiment.

FIG. 4, in particular, illustrates a process 400 executable at radio controller 300 of FIG. 3 for distinguishing between mere interference and mass random access events. At step 402, the radio controller, via a corresponding fixed terminal, monitors a radio channel for a first period of time and determines a first indication of signals received without detecting synchronization, or with detecting synchronization but failing error correction, during the first period of time. For example, in accordance with the ETSI-DMR standard, synchronization patterns are placed in the center of a transmitted burst. The existence of an interferer or a mass registration event could prevent the receiving infrastructure (base station, controller, etc.) from being able to decode a transmitted burst's synchronization pattern or could prevent the received burst from passing error correction. In some instances, for example, two or more transmitting subscriber devices that are substantially equal distances from a BS may transmit a random access burst with a same synchronization pattern at substantially a same time, in which case the receiving infrastructure may be able to receive and decode the synchronization pattern, and thus synchronize to the received transmission(s), but due to the fact that the remaining portions of the two simultaneously transmitted bursts will interfere with one another, the overall burst will still fail forward error correction (FEC). Thus, a detection of an active signal during an expected burst on a random access radio channel along with an inability to decode a synchronization pattern in that burst, or in some instances an ability to decode the synchronization pattern but an inability of the burst to pass FEC, may be an indication of either interference or a mass registration event on the random access radio channel. Other standards implementing other synchronization mechanisms and/or other synchronization pattern locations could be used as well.

The first period of time monitored could be, for example, between 0.5-10 seconds. The radio channel could be a random access control channel or rest channel of a trunked radio system over which registration requests and new call notifications are transmitted. In other embodiments, the radio channel could be a conventional channel over which registration requests, new call notifications, and actual calls are transmitted. In still further embodiments, the radio channel could be a broadband channel (such as a common control channel CCCH) over which registration requests and/or new call request or notifications are transmitted. Other possibilities exist as well.

The first indication could be a relative amount of time during the first time period during which signals were received without detecting synchronization or with detecting synchronization but failing error correction for the burst. In another example, the first indication could be a relative number of bursts during the first time period for which signals were received without detecting synchronization for the burst or with detecting synchronization for the burst but failing error correction for the burst. Other possibilities exist as well.

At step 404, the radio controller compares the first indication to a predetermined threshold indicative of an interference condition, e.g., due to an interferer or mass random access event. In other words, the first indication exceeding the predetermined threshold implies that there is a condition on the radio channel in which random access transmission from SDs are not being effectively or efficiently received and decoded. The condition causing the inability to decode random access transmissions could be a result of one or more interferer devices (other than random access transmitting SDs) that collide with and/or overpower the random access transmission(s) being attempted by the SDs. In other cases, the condition causing the inability to decode random access transmissions could be a result of collisions between the random access transmitting SDs simultaneously or overlappingly transmitting on the random access radio channel. The predetermined threshold is set at a value over which interference and/or collisions are sufficient to severely impact operational integrity of the radio controller and/or communications system. For example, the threshold may be 75% of the first time period, such that if the first time period were 4 seconds, the threshold may be set at more than or equal to 3 seconds. In another embodiment consistent with the two-slot channel structure of the ETSI-DMR standard (e.g., each physical frequency is divided into two multiplexed logical channels, each comprised of 30 ms bursts), and where the first time period is 4 seconds (e.g., equivalent to approximately 33 bursts per logical channel), the threshold may be set at more than or equal to 25 bursts for each logical channel. Other standards having different burst lengths and logical channel structures could be used as well. Furthermore, other thresholds could be used as well, including for example, any value in the 30%-90% range (e.g., of time, number of bursts, etc.).

If the radio controller determines at step 404 that the first indication does not exceed the predetermined threshold, processing proceeds back to step 402 where the radio controller monitors the radio channel for another period of time. If, on the other hand, the radio controller determines at step 404 that the first indication does exceed the predetermined threshold, processing proceeds to step 406.

At step 406, the radio controller causes an instruction to be broadcast identifying a subset of subscriber devices, less than all subscriber devices, allowed to transmit random access requests on the radio channel. The message could be transmitted via one or more still-operational BSs in the communications network. For example, and with respect to FIG. 2, even though BS 20 has become inoperative, the radio controller 26 of FIG. 2 (or some other radio controller) could cause a message to be transmitted, multicast, and/or unicast at BS 22 instructing some subset of SDs 11-16 to stop transmitting random access requests or transmissions on the radio channel on which the condition is detected or identifying some subset of SDs 11-16 as the only SDs that currently have permission to transmit random access requests or transmissions on the radio channel on which the condition is detected (e.g., implicitly instructing the remaining SDs to stop transmitting). The instruction may identify particular groups of subscriber devices (e.g., group G_A 42 of FIG. 2) allowed to transmit on the radio channel or a particular groups of subscriber devices (e.g., groups G_B 44 and G_C 46 of FIG. 2) not allowed to transmit on the radio channel. In other embodiments, the instruction may use other means of identifying subgroups, such as based on masked ranges of subscriber device IDs, locations of subscriber devices, types of SDs, RSSI ranges for signals received at the SDs from the BS(s), SD manufacturer identities, or some other parameter.

Figure 5:
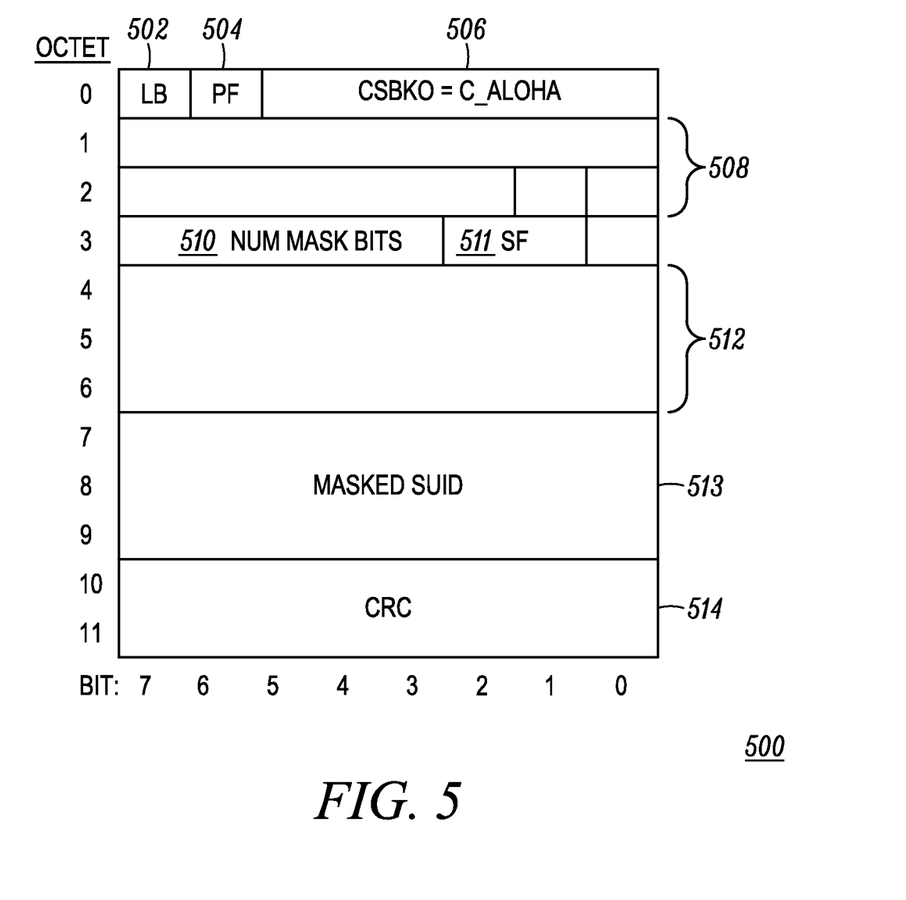
FIG. 5 is a message diagram of a message that may be broadcast in the communications network of FIG. 2 instructing a subset of subscriber devices to refrain from transmitting on the random access radio channel in accordance with some embodiments.

An example of an instruction useful for identifying a subset of subscriber devices, less than all subscriber devices, allowed to transmit random access requests on the radio channel is set forth in FIG. 5. The message 500 of FIG. 5 is an ETSI DMR-compliant C_ALOHA control signaling block (CSBK) message that includes several fields extended across 12 ordered octets. The first two fields include a "last block" (LB) 502 field and "protect flag" (PF) 504 field defined in the ETSI-DMR standard but which are not applicable to this application. An opcode field 506 that defines a function of the message 500 is set to a corresponding C_ALOHA value consistent with the ESTI-DMR standard. The next two octets 508 set forth additional ETSI-DMR standards-compliant information, including a feature ID field that defines a manufacturer and/or manufacturer feature set, but which is not applicable here. The fourth octet in the message 500 includes a NumMaskBits field 510 that includes a value identifying how many least significant bits (LSBs) of a radio ID set forth in field 513 of message 500 should be compared against the receiving SD's radio ID to determine if there is a match. The service function field 511 and field 512 are additional ETSI-DMR standard compliant fields that are not applicable and/or not required here. The MaskeSUID field 513 sets forth the "m" LSBs of a radio ID that must be the same as the receiving SD's radio ID for the receiving subscriber device to be allowed (or disallowed, depending on the system configuration) to transmit on the random access radio channel. The "m" number of bits of the MaskedSUID in field 513 to compare is defined by the value of the NumMaskBits fields 510. The last field in the message 500 may be a cyclic-redundancy-check (CRC) field 514 that includes a CRC value for use by receiving SDs in verifying that the message 500 has been received in an error-free state.

At step 406 of FIG. 4, for example, the radio controller may populate message 500 of FIG. 5 to include a value of "1" in the NumMaskBits field 510 and an address having a LSB of "0" in the MaskedSUID field 513, and cause the message to be transmitted, multicast, or broadcast out to SDs via one or more BSs, on a same random access radio channel as the random access radio channel being monitored by the radio controller, or perhaps on downlink channel corresponding to the (uplink) random access radio channel being monitored by the radio controller, or on an entirely different random access radio channel or scheduled radio channel in the communications system. SDs receiving such a message would match the LSB of the MaskedSUID field 513 to the LSB of their own radio ID and, if a match is found, either refrain from transmitting on the random access radio channel or continue transmitting on the random access radio channel being monitored by the radio controller, depending on system configuration. Assuming radio IDs are evenly distributed, only allowing SDs having a radio ID LSB equal to "0" would essentially instruct half of all SDs operating within the radio communications system to refrain from transmitting on the random access radio channel being monitored by the radio controller.

Other types of standard-based and/or proprietary messages could be created in a similar manner and similarly used for identifying a subset of subscriber devices, less than all subscriber devices, allowed to transmit random access requests on the radio channel being monitored by the radio controller.

Returning to FIG. 4, at step 408, the radio controller, via a corresponding fixed terminal, monitors the radio channel for a second period of time and determines a second indication of signals received without detecting synchronization or with detecting synchronization but failing error correction during the second period of time. Step 408 may be conducted in a similar manner as step 402. Although the second period of time may be different than the first period of time, in some embodiments, the second period of time is the same as the first period of time.

At step 410, the radio controller compares the second indication to the first indication (perhaps after adjusting for any differences between the first and second periods of time). If the radio controller determines, as a result of the comparison, that the second indication is greater than or substantially equal to the first indication, e.g., that the interference condition has apparently not improved as a result of the actions taken at step 406, processing proceeds to step 412, where the radio controller determines that the interferer is likely the culprit of the interference condition occurring on the radio channel. As a result of this determination, the radio controller can cause further action to be taken to attempt to resolve the existence of an interferer on the radio channel, perhaps including instructing a fixed terminal associated with the radio channel to change channels to avoid the interferer, among other possibilities.

If, on the other hand, the radio controller determines, as a result of the comparison, that the second indication is less than the first indication, e.g., that the interference condition has improved as a result of actions taken at step 406, processing proceeds to step 414, where the radio controller determines that the mass random access event is likely the culprit of the interference condition occurring on the radio channel. As a result of this determination, the radio controller can cause further action to be taken to attempt to resolve the mass random access event, perhaps as set forth below with respect to FIG. 6.

Figure 6:
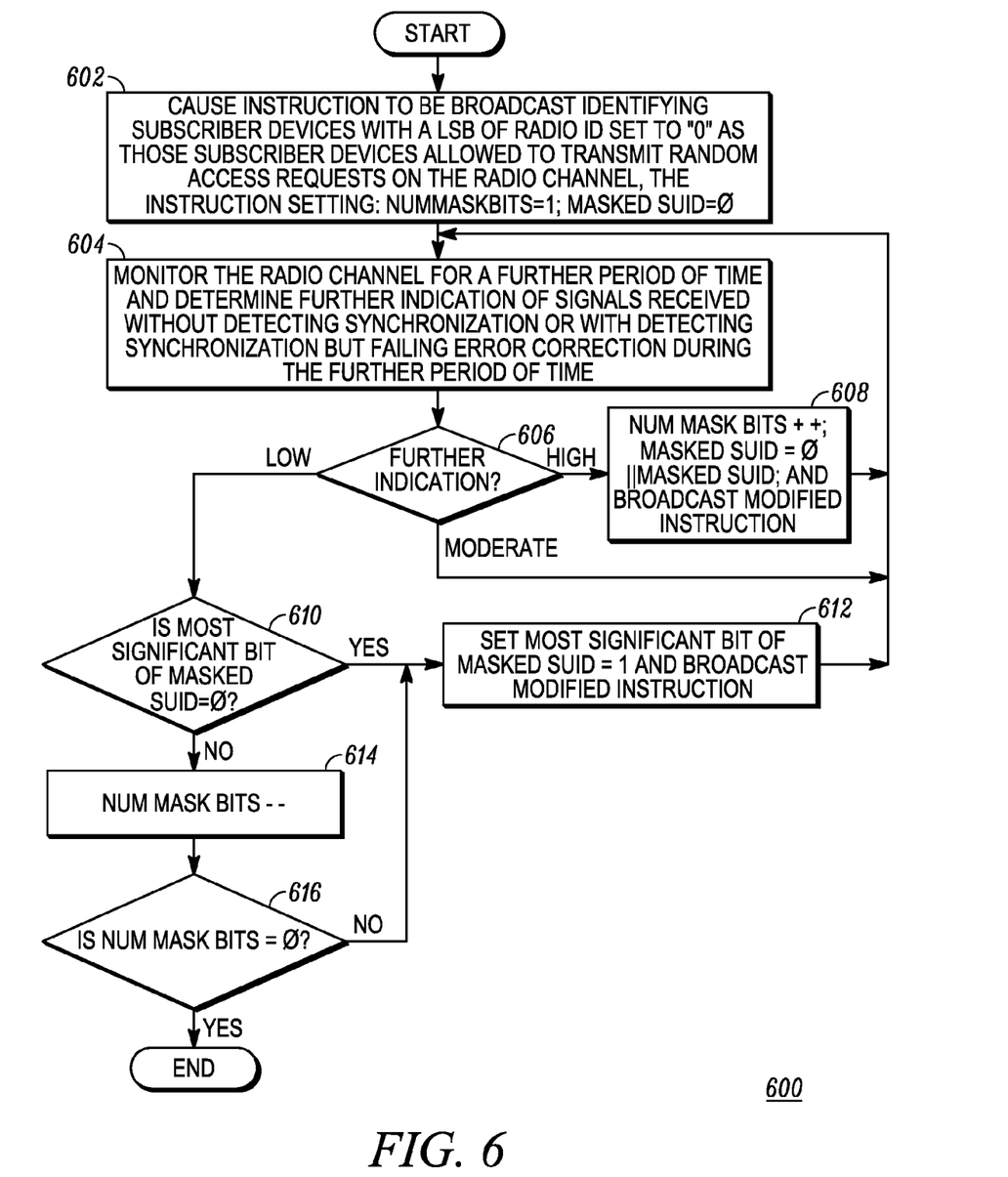
FIG. 6 is a further flow diagram illustrating processing steps at the radio controller of FIG. 3 for taking corresponding action when a mass random access event is detected, in accordance with an embodiment.

FIG. 6, in particular, illustrates an example process 600 executable at radio controller 300 of FIG. 3 for further neutralizing the mass random access event determined to be occurring at step 414 of FIG. 4, or as a result of some other mechanism of determining that a mass random access event is occurring on a monitored channel in a communication system. While FIG. 6 is described below as a continuation of the process of FIG. 4, in other embodiments, FIG. 6 may stand alone and a determination that a mass random access event is likely occurring on the radio channel may be made using a different mechanism than that set forth in FIG. 4.

At step 602, the radio controller causes an instruction, perhaps such as that set forth in FIG. 5 above, to be broadcast identifying SDs with a LSB of a radio ID set to "0" as those SDs allowed to transmit random access requests on the random access radio channel being monitored by the radio controller, perhaps by setting a value of "1" in the NumMaskBits field of the instruction and an address having a LSB of "0" in the MaskedSUID field of the message. Of course, in other embodiments, one or more additional or different bit positions could be identified in the instruction by setting different values for the NumMaskBits and MaskedSUID fields of the instruction. As set forth earlier, assuming radio IDs are evenly distributed, only allowing SDs having a radio ID LSB equal to "0" would essentially instruct half of all SDs operating within the radio communications system to refrain from transmitting on the random access radio channel being monitored by the radio controller. Steps 604-614 then provide a mechanism for dynamically refining the SDs allowed to transmit on the random access radio channel being monitored by the radio controller based on continued monitoring of the interference condition on the radio channel. While step 602 of FIG. 6 may be executed separately from step 406 of FIG. 4, in some embodiments where processes 400 and 600 are executed at a same radio controller, they may be the same step.

At step 604 of FIG. 6, the radio controller, via a corresponding fixed terminal, monitors the radio channel for a further period of time and determines a further indication of signals received without detecting synchronization or with detecting synchronization but failing error correction during the further period of time.

While step 604 of FIG. 6 may be executed separately from step 408 of FIG. 4, in some embodiments where processes 400 and 600 are executed at a same radio controller, they may be the same step, in which case the further period of time of step 604 may be the same or different from the first period of time of step 402 of FIG. 4. Regardless, step 604 may be conducted in a same or similar manner as steps 402 and/or 408 of FIG. 4.

At step 606, the radio controller compares the further indication to a plurality of threshold values and determines if the further indication is low, moderate, or high. For example, if the further indication indicates that the amount of time during the further period time that a signal but no sync condition occurs (or during which synchronization is detected but error correction fails) is high (e.g., >75% of the time), processing may proceed to step 608. If, however, the further indication indicates that the amount of time during the further period time that a signal but no sync condition (or during which synchronization is detected but error correction fails) occurs is low (e.g., <25% of the time), processing may proceed to step 610. If, on the other hand, the further indication indicates that the amount of time during the further period of time that a signal but no sync condition (or during which synchronization is detected but error correction fails) occurs is moderate (e.g., not low or high, in this case, >25% and <75%), processing may proceed back to step 604 where the radio controller again monitors the radio channel for another further period of time. While thresholds of 25% and 75% are set forth in this example, other symmetric or asymmetric thresholds could be used for low and high indications as well. For example, the low threshold could range from 5-40%, and the high threshold could range from 60-95%. Other possibilities exist as well.

Assuming that the radio controller determines at step 606 that the further indication indicates that the signal but no sync condition (or the condition in which synchronization is detected but error correction fails) is high, processing proceeds to step 608, where the radio controller further restricts the number of SDs allowed to access the radio channel. More specifically, in this case, the radio controller increases the number of mask bits that SDs should compare to their own radio ID by increasing the value of NumMaskBits (such as by, for example, incrementing the value by 1 or more) and appending a further digit such as a "0" to the MaskedSUID (if not already set to a 0 or 1). Of course, a "1" could be appended instead or in addition. Other increment values and appended digits are possible as well. After modifying the NumMaskBits and MaskedSUID fields, the radio controller causes a correspondingly modified instruction to be broadcast in a manner similar to that set forth in step 602.

Assuming, instead, that the radio controller determines at step 606 that the further indication indicates that the signal but no sync condition (or the condition in which synchronization is detected but error correction fails) is low, processing proceeds to step 610, where the radio controller increases the number of SDs allowed to access the radio channel. More specifically, in this case, the radio controller determines if the most significant bit (MSB) of the MaskedSUID (or the bit position identified based on the value of the NumMaskBits variable, if a full address is already set in the MaskedSUID field) is "0." If so, processing proceeds to step 612, where the MSB of the MaskedSUID (or the bit position identified based on the value of the NumMaskBits variable) is set to "1". Of course, in other embodiments such as when a "1" is appended in step 608 instead of a "0", the MSB or other bit position identified by the NumMaskBits variable could instead be set to a "0" in step 612. After modifying the MaskedSUID field value, the radio controller causes a correspondingly modified instruction to be broadcast in a manner similar to that set forth in step 602.

If, on the other hand, the radio controller determines at step 610 that the MSB of the MaskedSUID (or the bit position identified based on the value of the NumMaskBits variable, if a full address is already set in the MaskedSUID field) is "1", processing proceeds to step 614, where the value of the NumMaskBits variable is decremented (such as by, for example, decrementing the value by 1 or more). In this case, NumMaskBits is decremented by 1. After step 614, processing proceeds to step 616, where the radio controller determines if the value of NumMaskBits has reached a value of "0" (or, in some embodiments, "0" or below). If the radio controller determines that NumMaskBits has reached 0, it may determine that the mass registration event has been mostly or completely solved, and the process ends. In some embodiments, the radio controller may cause a modified instruction message to be broadcast that includes the NumMaskBits value set to 0, which could be used and/or interpreted by receiving SDs to indicate that the mass registration event is over and all SDs may access the radio channel and transmit random access requests according to their normal rules of operation (e.g., SDs are no longer prevented from accessing the radio channel due to the mass registration event).

If, on the other hand, the radio controller determines at step 616 that that NumMaskBits is still some positive, non-zero integer, processing proceeds to step 612, where the MSB of the MaskedSUID (or the bit position identified by the NumMaskBits variable) is set to "1" and a modified instruction message is broadcast with the modified MaskedSUID and NumMaskBits values.

3. Conclusion

In accordance with the foregoing, an improved method and apparatus for handling mass registration events, and in particular, for distinguishing between mere interference and mass random access events and taking corresponding action in the infrastructure as a result. As a result, a more robust, useful, and efficient group communications system can be provided, improving communication capabilities and services provided to incidence response groups. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for responding to a mass random access event, the method comprising:
    monitoring, at a radio controller, a radio channel for a first period of time and determining a first indication of signals received without detecting synchronization or with detecting synchronization but failing error correction during the first period of time;
    responsive to determining, by the radio controller, that the first indication of signals received without detecting synchronization or with detecting synchronization but failing error correction during the first period of time is above a predetermined threshold indicative of an interference condition comprising one of an interferer and mass random access event, causing an instruction to be broadcast identifying a subset of subscriber devices, less than all subscriber devices, allowed to transmit random access requests on the radio channel;
    monitoring, at the radio controller, the radio channel for a second period of time and determining a second indication of signals received without detecting synchronization or with detecting synchronization but failing error correction during the second period of time; and
    if the second indication is an improvement over the first indication, determining, by the radio controller, that the interference condition is caused by the mass random access event.

2. The method of claim 1, further comprising if the second indication is not an improvement over the first indication, determining, by the radio controller, that the interference condition is caused by the interferer.

3. The method of claim 1, further comprising causing an instruction to be broadcast identifying a second subset of subscriber devices, in addition to the first subset of subscriber devices but still less than all subscriber devices, allowed to transmit random access requests on the radio channel.

4. The method of claim 3, further comprising iteratively increasing the subsets of subscriber devices allowed to transmit random access requests on the radio channel until all subscriber devices have been allowed to transmit random access requests on the radio channel.

5. The method of claim 1, further comprising causing an instruction to be broadcast identifying a second subset of subscriber devices that is a subset of the first subset of subscriber devices, allowed to transmit random access requests on the radio channel, such that at least one subscriber device in the first subset is no longer allowed to transmit random access requests on the radio channel.

6. The method of claim 5, further comprising iteratively reducing a size of the subset of subscriber devices allowed to transmit random access requests on the radio channel until a number of signals received without detecting synchronization or with detecting synchronization but failing error correction during a third period of time falls below a second predetermined threshold level.

7. The method of claim 1, wherein the radio channel is one of a control channel and a rest channel.

8. The method of claim 1, wherein the random access requests are registration requests.

9. The method of claim 1, wherein the message identifies a subset of subscriber devices by including a bitmask and an indication of which bits to compare between the bitmask and radio identifiers stored at each of the plurality of subscriber devices, such that a match is an indication to the receiving subscriber device that it is one of allowed to transmit random access requests on the radio channel and not allowed to transmit random access requests on the radio channel.

10. The method of claim 9, wherein the instruction comprises a European Telecommunication Standards Institute (ETSI) Digital Mobile Radio (DMR) standard compliant C_ALOHA message.

11. The method of claim 1, wherein the first period of time is between 0.5 and 5 seconds, inclusive.

12. The method of claim 1, wherein the first period of time and the second period of time are substantially the same.

13. The method of claim 1, wherein the mass random access event is caused by one of a site failure at a nearby radio site, an initial powering on of a radio site associated with the radio controller, an initial powering on of a large number of subscriber devices within a short period of time, an occurrence of an event requiring an emergency response, and a change in affiliation of a large number of subscriber devices within a short period of time.

14. The method of claim 1, further comprising, after resolving the mass random access event and registering requesting subscriber devices, providing group-based half or full-duplex communications services to the registered subscriber devices.

15. The method of claim 1, wherein the first and second indications are relative amounts of time during the corresponding first and second time periods during which signals were received without detecting synchronization or with detecting synchronization but failing error correction.

16. The method of claim 1, wherein the first and second indications are a relative number of bursts during the corresponding first and second time periods for which signals were received without detecting synchronization for the burst or with detecting synchronization for the burst but failing error correction for the burst.

17. A radio controller in a radio system, the controller comprising:
   a transceiver;
   a data store; and
   one or more processors configured to:
      monitor, via the transceiver, a radio channel for a first period of time and determine a first indication of signals received without detecting synchronization or with detecting synchronization but failing error correction during the first period of time;
      responsive to determining that the first indication of signals received without detecting synchronization or with detecting synchronization but failing error correction during the first period of time is above a predetermined threshold indicative of an interference condition comprising one of an interferer and mass random access event, cause an instruction to be broadcast, via the transceiver, identifying a subset of subscriber devices, less than all subscriber devices, allowed to transmit random access requests on the radio channel;
      monitoring, via the transceiver, the radio channel for a second period of time and determining a second indication of signals received without detecting synchronization or with detecting synchronization but failing error correction during the second period of time; and
      if the second indication is an improvement over the first indication, determining that the interference condition is caused by the mass random access event.

18. The radio controller of claim 17, wherein the one or more processors are further configured to, if the second indication is not an improvement over the first indication, determine that the interference condition is caused by the interferer.

19. The radio controller of claim 17, wherein the one or more processors are further configured to cause an instruction to be broadcast, via the transceiver, identifying a second subset of subscriber devices, in addition to the first subset of subscriber devices but still less than all subscriber devices, allowed to transmit random access requests on the radio channel.

20. The radio controller of claim 17, wherein the one or more processors are further configured to cause an instruction to be broadcast, via the transceiver, identifying a second subset of subscriber devices that is a subset of the first subset of subscriber devices, allowed to transmit random access requests on the radio channel, such that at least one subscriber device in the first subset is no longer allowed to transmit random access requests on the radio channel.

* * * * *